United States Patent [19]

Boston

[11] Patent Number: 4,766,293
[45] Date of Patent: Aug. 23, 1988

[54] PORTABLE FINANCIAL TRANSACTION CARD CAPABLE OF AUTHORIZING A TRANSACTION IN FOREIGN CURRENCIES

[75] Inventor: Vincent Boston, San Mateo, Calif.

[73] Assignee: VISA International Service Association, San Mateo, Calif.

[21] Appl. No.: 878,619

[22] Filed: Jun. 26, 1986

[51] Int. Cl.[4] .................. G06F 15/30; G06F 7/38
[52] U.S. Cl. ................... 235/379; 235/380; 235/492; 235/382.5; 364/408
[58] Field of Search ............... 235/379, 380, 492, 487, 235/488, 381, 384, 382, 382.5; 340/825.33, 825.35; 364/400, 401, 405, 408, 406

[56] References Cited

U.S. PATENT DOCUMENTS

| | | | |
|---|---|---|---|
| 3,971,916 | 7/1976 | Moreno | 364/200 |
| 4,001,550 | 1/1977 | Schatz | 235/379 |
| 4,007,355 | 2/1977 | Moreno | 235/379 |
| 4,092,524 | 5/1978 | Moreno | 235/487 |
| 4,102,493 | 7/1978 | Moreno | 235/488 |
| 4,211,919 | 7/1980 | Ugon | 235/487 |
| 4,222,516 | 9/1980 | Badet et al. | 235/487 |
| 4,249,163 | 2/1981 | Maurer et al. | 235/379 |
| 4,251,867 | 2/1981 | Uchida et al. | 364/408 |
| 4,256,955 | 3/1981 | Giraud et al. | 235/492 |
| 4,295,041 | 10/1981 | Ugon | 235/488 |
| 4,417,413 | 11/1983 | Hoppe et al. | 235/488 |
| 4,443,049 | 4/1984 | DePommery et al. | 439/373 |
| 4,447,716 | 5/1984 | Aigo | 235/487 |
| 4,485,300 | 11/1984 | Peirce | 235/380 |
| 4,614,861 | 9/1986 | Pavlov et al. | 235/380 |
| 4,701,601 | 10/1987 | Francini et al. | 235/380 |

FOREIGN PATENT DOCUMENTS

| | | |
|---|---|---|
| 2905190 | 8/1980 | Fed. Rep. of Germany . |
| 2923478 | 12/1980 | Fed. Rep. of Germany . |
| 3410065 | 10/1984 | Fed. Rep. of Germany . |
| 527370 | 11/1983 | Spain . |
| 1491822 | 11/1977 | United Kingdom . |

Primary Examiner—Raymond F. Cardillo
Assistant Examiner—Robert A. Weinhardt
Attorney, Agent, or Firm—Limbach, Limbach & Sutton

[57] ABSTRACT

A transaction card is disclosed capable of authorizing a transaction in a foreign currency. The subject transaction card includes an internal microprocessor which is connected to a memory. Stored within the memory is a transaction limit associated with each account of the cardholder. Also stored in the memory are one or more rates for converting the transaction limit into foreign currencies. In operation, the cardholder will select the foreign currency which will be used for a purchase. After the selection, the processor will convert the transaction limit from a local or base currency to the selected foreign country. Thereafter, during the transaction, the processor will compare the transaction amount with the converted transaction limit to determine if an approval code should be generated. In a preferred embodiment, a key pad is provided on the transaction card to facilitate data entry. In addition, an LCD readout is provided for displaying the approval code.

10 Claims, 4 Drawing Sheets

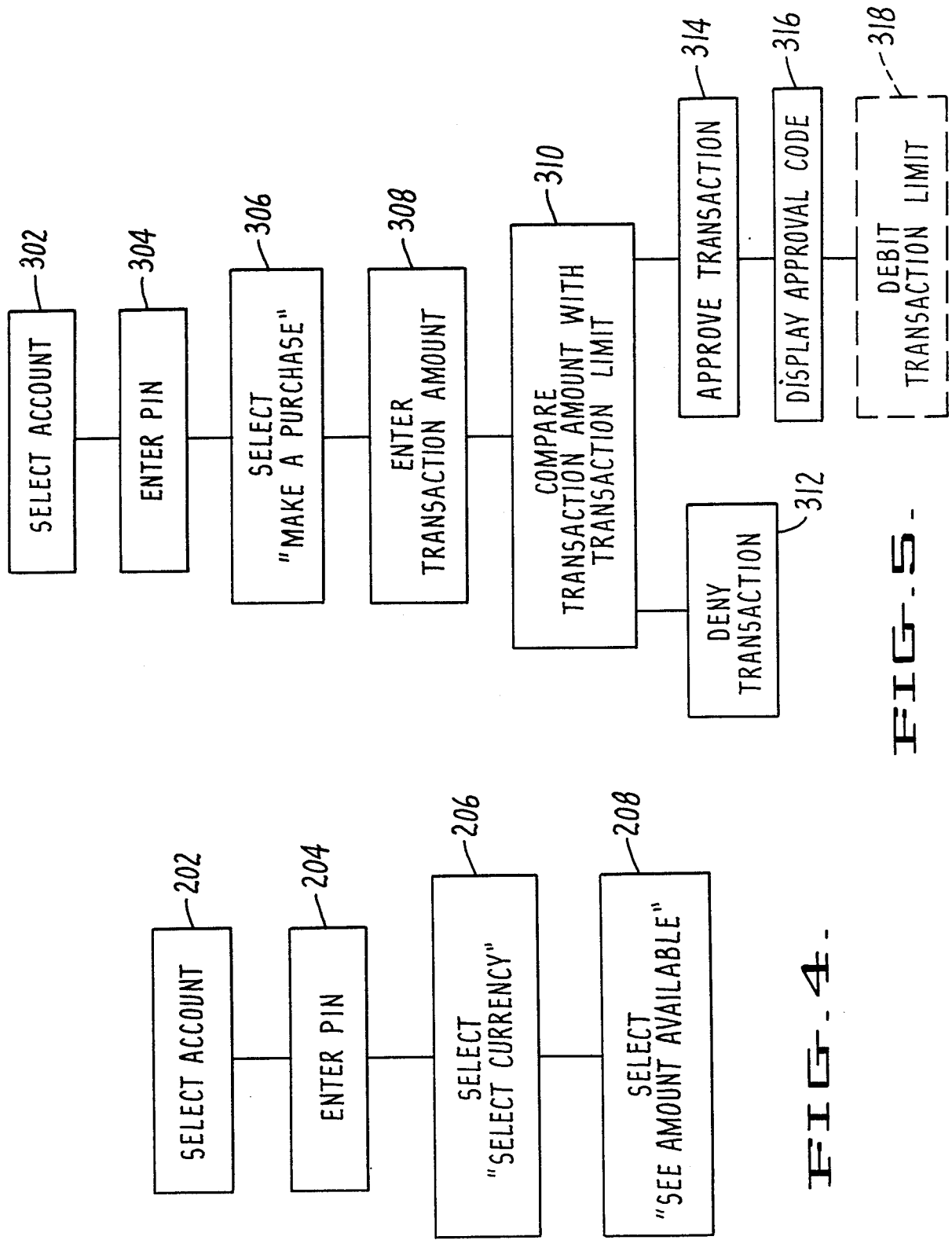

PORTABLE FINANCIAL TRANSACTION CARD CAPABLE OF AUTHORIZING A TRANSACTION IN FOREIGN CURRENCIES

DESCRIPTION

TECHNICAL FIELD

The subject invention relates to a portable transaction card having an internal microprocessor. The subject card is capable of approving transactions in foreign currencies.

BACKGROUND OF THE INVENTION

In recent years, there has been a strong trend towards a cashless society. To this end, large transaction card networks have been developed for purchasing goods and services. Along with widespread use of transaction cards there has also developed concurrent fraud losses. To combat these losses, a number of schemes have been implemented. The most common scheme is to print lists of cards which have been lost or stolen or whose holders have exceeded their assigned credit limits. When a card is presented during a transaction, the user's account number is compared with the circulated list to determine if the transaction should be authorized. This approach suffers from many drawbacks, none the least of which is the fact that the printed lists are always somewhat out of date.

In order to overcome these shortcomings, a sophisticated network of on-line transaction terminals have been placed in merchant locations for authorizing transactions. In this system, the card number and transaction amount are entered into the terminal. The terminal then transmits that information to the card issuer which determines if the transaction should be approved. The approval decision can be based on a number of factors. For example, the account number can be compared with a current list of lost or stolen cards. The transaction amount could also be compared to maximum transaction limit for that cardholder based on his credit worthiness or current deposits.

While the above described on-line system is inherently more reliable than the distributed card list, it also has drawbacks. For example, the network requires numerous communication links which give rise to significant carrier costs. In addition, where large distances are involved, the response time can be less than satisfactory from both a customer and merchant standpoint.

Various approaches have been implemented to reduce these problems. As described in U.S. Pat. No. 4,485,300, issued Nov. 27, 1984 to Peirce, approval parameters supplied by the card issuer can be distributed to local area processors such that communication costs can be reduced. Another enhancement technique is described in U.S. Ser. No. 730,309, filed May 2, 1985, and now U.S. Pat. No. 4,734,564 issued Mar. 29, 1988 wherein approval information is stored on the card itself. This approval information is read and acted upon by the transaction terminal located at the merchant. In this manner, certain approvals can be completed in an off-line manner, that is, where there is no connection to either the issuer or a central processor. The above cited patent and application are both assigned to the assignee of the subject invention and the disclosures therein are incorporated by reference.

One method of implementing the off-line approval system described in Ser. No. 730,309, cited above, is to encode the authorization data on a magnetic stripe formed on the card. More sophisticated off-line approval procedures can be performed where the transaction card is provided with an internal microprocessor and memory.

The first cards containing microprocessors, called smart cards, were developed approximately ten years ago and are used to a great extent in the European community. These cards typically include electrical contacts to provide an interface with a local transaction terminal. Information about the cardholder and associated transaction parameters can be stored and updated inside the card. By reading this information the terminal can carry out an off-line authorization procedure.

At the present time, smart cards are becoming very sophisticated, such that the authorization procedure can be carried out in the card itself. For example, the card can store a dollar amount which would represent the maximum amount of a transaction that could be authorized. During the transaction, the transaction amount could be entered into the smart card via the terminal. The microprocessor in the card can then compare transaction amount with the stored transaction limit to determine if the transaction should be approved. If the transaction is approved, an approval code would be generated and supplied to the customer and merchant.

The use of smart cards can further reduce communication costs, time delays and fraud losses. Unfortunately, this approach is not geared towards international travel where one cardholder will be dealing with varying currencies. As can be appreciated, the transaction limit is stored in the card in the form of a local or base currency, while purchases might be priced in a different, foreign currency. In this case, it would be impossible for the microprocessor in the card to make the comparison necessary for authorization. Accordingly, it would be desirable to provide an improved transaction card which could operate with foreign currencies.

In the prior art, a number of devices have been made which aid in currency conversion. For many years, mechanical, slide rule-type of devices have been designed to aid the traveler in converting currency. More recently, a number of microprocessor based devices have been developed for electronically converting an amount from one currency to another.

One example of a microprocessor driven currency converter is disclosed in German application Ser. No. 3410065, laid open Oct. 31, 1984. In this reference, it is suggested that a microprocessor driven, currency converter could be integrated in objects of frequent daily use, such as wrist watches. (See also German application Ser. Nos. 2923478, laid open Dec. 11, 1980, and 2905190, laid open Aug. 21, 1980.) The above disclosures evidence the need of a traveler to easily convert currencies to facilitate a cash purcahse. However, to date, this need has not been addressed for purchases made with a transaction card. More specifically, no transaction card has been developed with the ability to convert a stored transaction limit to a foreign currency and then perform an internal authorization procedure.

Accordingly, it is an object of the subject invention to provide a new and improved transaction card capable of authorizing a transaction in a foreign currency.

It is another object of the subject invention to provide a new and improved transaction card which includes a means for entering a conversion rate to permit the conversion of a stored transaction limit to a foreign currency.

It is still another object of the subject invention to provide a new and improved transaction card which can be readily used in foreign countries.

It is still a further object of the subject invention to provide a new and improved transaction card which can generate an approval of a transaction in a foreign currency without connection to a central processor.

SUMMARY OF THE INVENTION

In accordance with these and many other objects, the subject transaction card includes a storage means for holding a transaction limit represented in a base currency, such as dollars. The storage means also holds rates for converting the base currency into different foreign currencies. A data entry means is provided for supplying the transaction limit and the conversion rates to the storage means.

In accordance with the subject invention, a microprocessor is connected to the data entry means and storage means and functions such that when a transaction is to be carried out in a currency other than the base currency, the processor means will convert the transaction limit stored in the base currency into the foreign currency using the associated conversion rate. Thereafter, the transaction amount expressed in the foreign currency and entered through the data entry means is compared to the converted transaction limit to determine if the transaction should be approved.

It is believed that the smart cards presently available contain all of the hardware necessary to carry out the basic concept of the subject invention. In the existing smart cards, the data entry means is defined by electronic contacts which interface with an transaction terminal. In the preferred and illustrated embodiment of the subject invention, the transaction card can carry out the authorization procedure independently of the terminal and is provided with its own data entry means, in the form of a key pad and an LCD display.

In the preferred embodiment of the subject transaction card, the key pad is activated to select the currency used in the particular transaction. This selection will cause the microprocessor to convert the stored transaction limit to the selected currency. The transaction amount is entered through the key pad and an approval code is generated internally and shown on the display means. This approval code can be noted on a sales draft for future reference.

Further objects and advantages will be apparent from the following detailed description taken in conjunction with the drawings in which:

BRIEF DESCRIPTION OF THE DRAWINGS

FIG. 4 is a flow chart illustrating the steps taken to select a foreign currency in accordance with the subject invention.

FIG. 5 is a flow chart illustrating the steps taken to carry out a transaction in a foreign currency in accordance with the subject invention.

DETAILED DESCRIPTION OF THE PREFERRED EMBODIMENT

Figure 1:
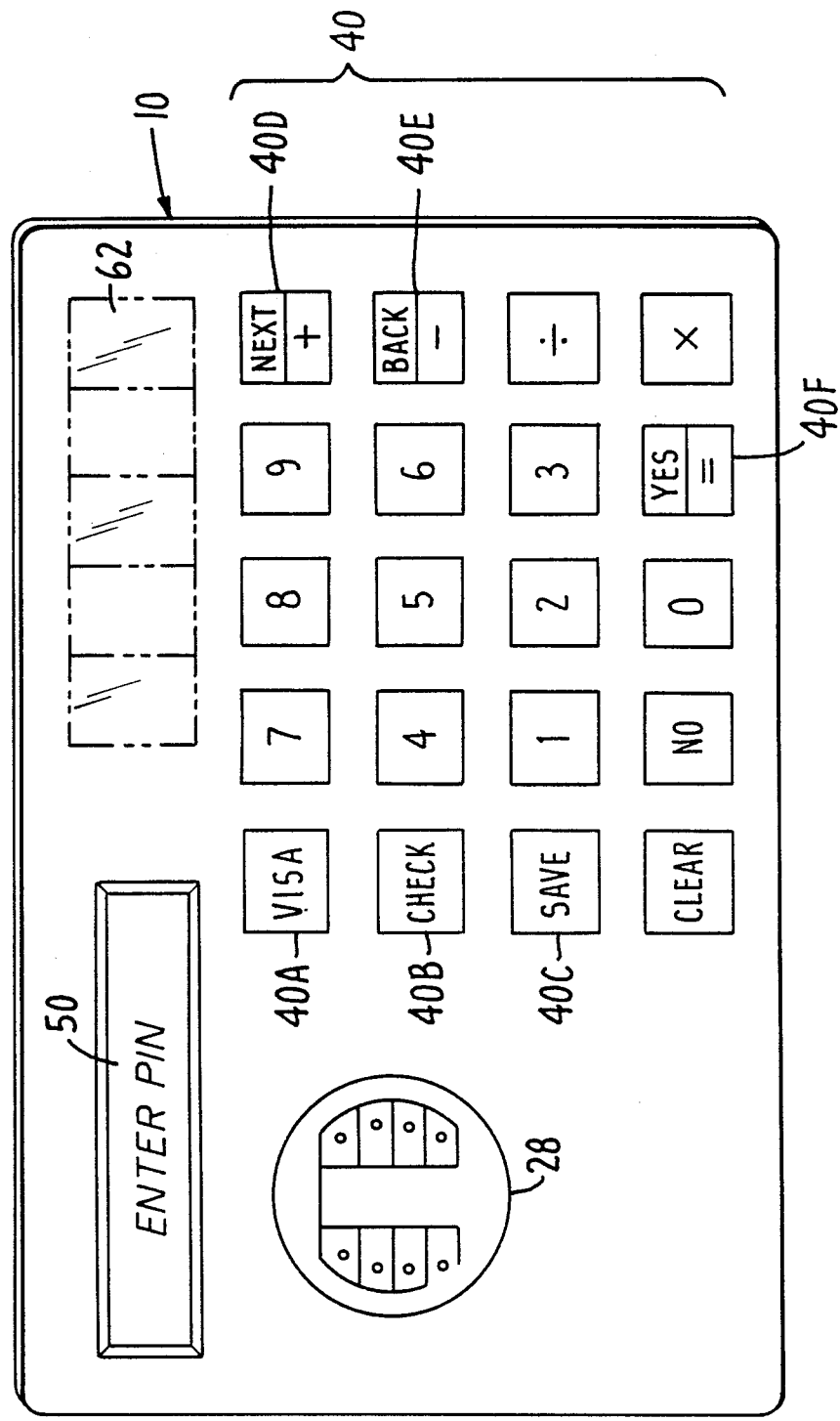
FIG. 1 is a plan view of a transaction card formed in accordance with the subject invention.
Figure 2:
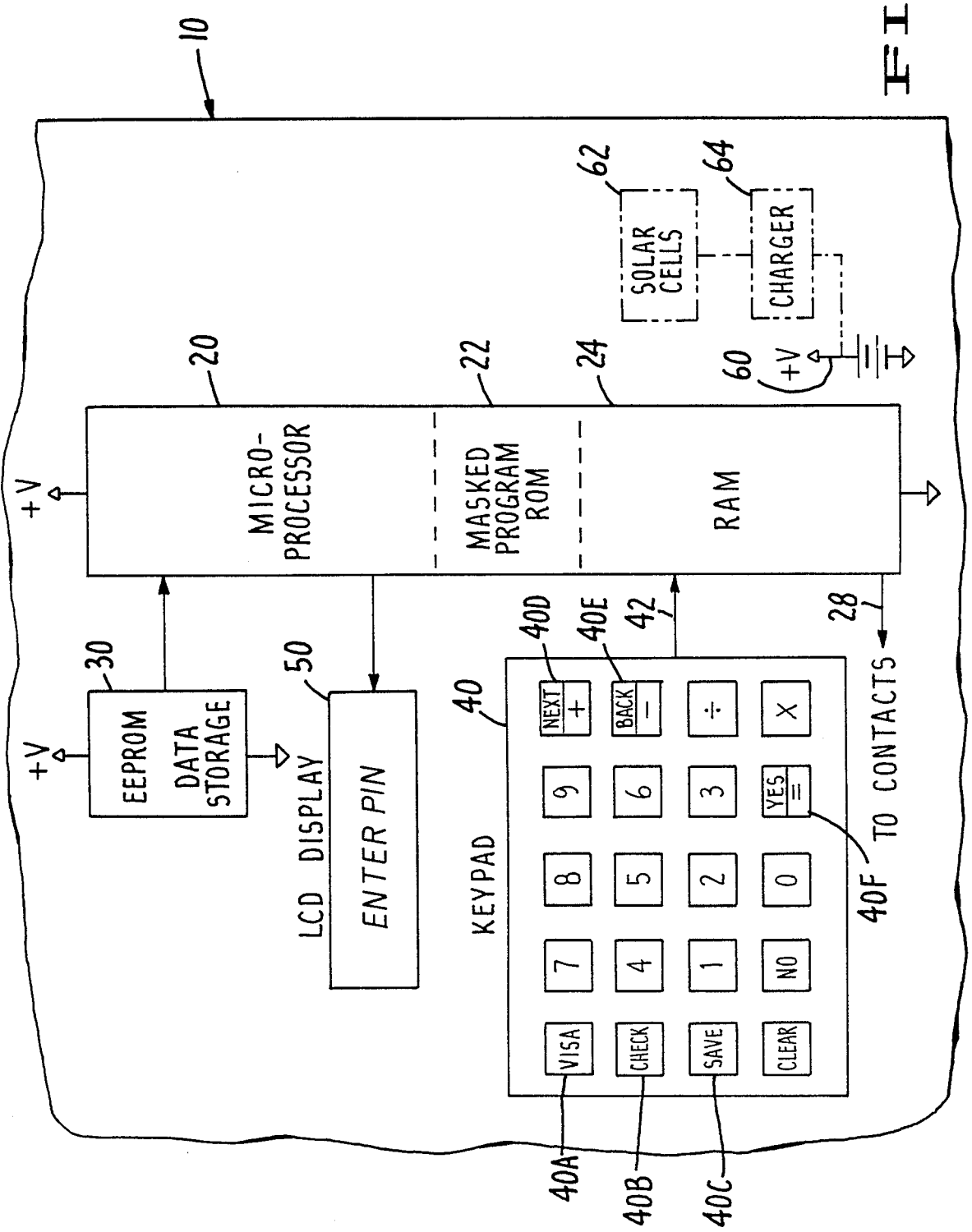
FIG. 2 is a schematic diagram illustrating the components of a transaction card of the subject invention.

Referring to FIGS. 1 and 2, there is illustrated a transaction card having the elements necessary to carry out the objects of the subject invention. A more complete description of a card suitable for this type of application can be found in U.S. application, Ser. No. 727,869, filed Apr. 26, 1985, now U.S. Pat. No. 4,701,601 issued Oct. 20, 1987 assigned to the same assignee as the subject invention and incorporated herein by reference.

As disclosed in the latter application, a significant body of published literature exists regarding the fabrication of microprocessor based transaction cards or smart cards. The objects of the subject invention can be obtained by modifying any of a number of the existing prior art smart cards. Accordingly, the disclosure herein will be limited to a discussion of the modifications necessary to carry out the stated objects of the subject invention.

As shown in FIG. 2, the card 10 of the subject invention will include a microprocessor 20 which is connected to storage means. In the illustrated embodiment, the storage means is defined by a masked program ROM 22 and RAM 24. The masked program ROM 22, which is typically part of the microprocessor, will include the basic operating instructions of the transaction card. ROM 22 can also include default programs to allow the transaction card to operate in other modes, such as a conventional calculator.

RAM space 24 is provided as temporary storage and to facilitate interfacing between the inputs of the key pad and electrical contacts. In the preferred embodiment, additional storage in the form of an EEPROM 30 is provided for holding information, such as the transaction limit, discussed below, and one or more Personal Identification Numbers (PINS).

In accordance with the subject invention, a means for entering data into the storage means must be provided. One suitable data entry means, illustrated in the drawings, includes a plurality of electrical contacts 28. The electrical contacts 28 are intended to allow the card to interface with a transaction terminal located at a merchant. The contacts 28 can be used to both transmit and receive data and can also provide an independent power source for the operation of the smart card. At the present time, uniform standards are still being developed for electrical interfaces for smart cards. One suitable design can be found in U.S. Pat. No. 4,222,516 to Badet.

The hardware described above, modified in a manner discussed below, is sufficient to carry out the objects of the subject invention. In this configuration, the card could be operated only when connected to a transaction terminal. However, it is desirable that the card be capable of performing the authorization procedure independent of a transaction terminal.

In order to operate independently, a human operable data entry means must be provided. In the illustrated embodiment, the data input means is shown as a key pad 40. The key pad 40 is connected to the random access memory 24 through line 42 which is typically a plurality of strobe lines. The key pad includes a number of keys which allow the cardholder to select accounts, enter transaction amounts and scroll through displayed prompts, as discussed later in detail with regard to the operation of the card.

Where the card is intended to operate independently of a terminal, it would also be desirable to provide a means for displaying human readable output. In this case, the means is defined by an LCD display 50 driven by the microprocessor 20.

A means for powering the card independent of the terminal should also be provided. This requirement is satisfied in the subject invention through a battery 60. This battery may be recharged any time that the transaction card is used in conjunction with a transaction terminal. A panel of solar cells 62 can be provided as an alternate source of energy. The solar cell 62 would be connected to a charger 64 which, in turn, is connected to the battery 60.

The card described above can be used to carry out the transactions in a manner similar to smart cards known in the prior art. For further information on smart cards see U.S. Pat. Nos. 3,971,916 to Moreno; 4,001,550 to Schatz; 4,007,355 to Moreno; 4,092,524 to Moreno; 4,102,493 4,211,919 to Ugon; 4,256,955 to Giraoud; 4,295,041 to Urgon; 4,417,413 to Hoppe; 4,443,049 to De Pommery and 4,447,716 to Aigo.

In the illustrated embodiment, a transaction is initiated by pressing a key corresponding to the account which will be involved. The card can contain information regarding one or more accounts as indicated by keys 40A, B and C. Once the account is selected, a secret password or personal identification number (PIN) must then be entered in order to continue the transaction. The amount of the transaction would then be entered through the numeric keys on the key pad 40. The microprocessor will then evaluate the transaction for approval. If an approval can be given, an authorization code will be generated and shown on the display 50.

Similar steps would be carried out if the card were connected to a local terminal. In this case, data would flow through contacts 28. The transaction amount could be entered into the key pad of the transaction terminal and then supplied to the card via contacts 28. The microprocessor in the card would then evaluate the transaction and generate either an approval or a denial which could be transmitted back to the terminal through contacts 28.

The authorization decision is made by the microprocessor by comparing the entered transaction amount with a transaction limit for the selected account stored in the card. The transaction limit is set by the issuer and can take a number of forms. Where the account is for checking, savings or other similar types of accounts, the transaction limit will typically represent the amount which the customer has on deposit with the issuer. If the transaction amount does not exceed the stored transaction limit, the transaction can be approved. After the transaction is approved, the transaction limit is debited by the amount of the transaction such that the transaction limit represents a declining balance for that account.

The transaction limit can also be a fixed dollar level based upon the credit worthiness of the customer. For example, a certain customer may be assigned a transaction limit of $200. In this case, the card could approve any purchase which does not exceed $200. If the purchase exceeded $200, a more in depth analysis of the cardholder would be made by linking the card to the online approval network.

In the transaction procedures described above, the microprocessor must compare the stored transaction limit with the transaction amount. This comparison is only possible where the two values are in the same currency. If the cardholder travels to a foreign country where the transaction amount is expressed in currency different from the local or base currency of the issuer, off-line approval would be impossible. This drawback is overcome in the subject invention as described in detail below.

Briefly, the subject transaction card is provided with one or more rates for converting the base currency into different foreign currencies. The cardholder can then select the desired currency from the data input means. The microprocessor converts the transaction limit from the base currency to the selected foreign currency. Thereafter, when the transaction amount is entered, it can be directly compared with the converted transaction limit to permit the generation of an approval code.

Figure 3:
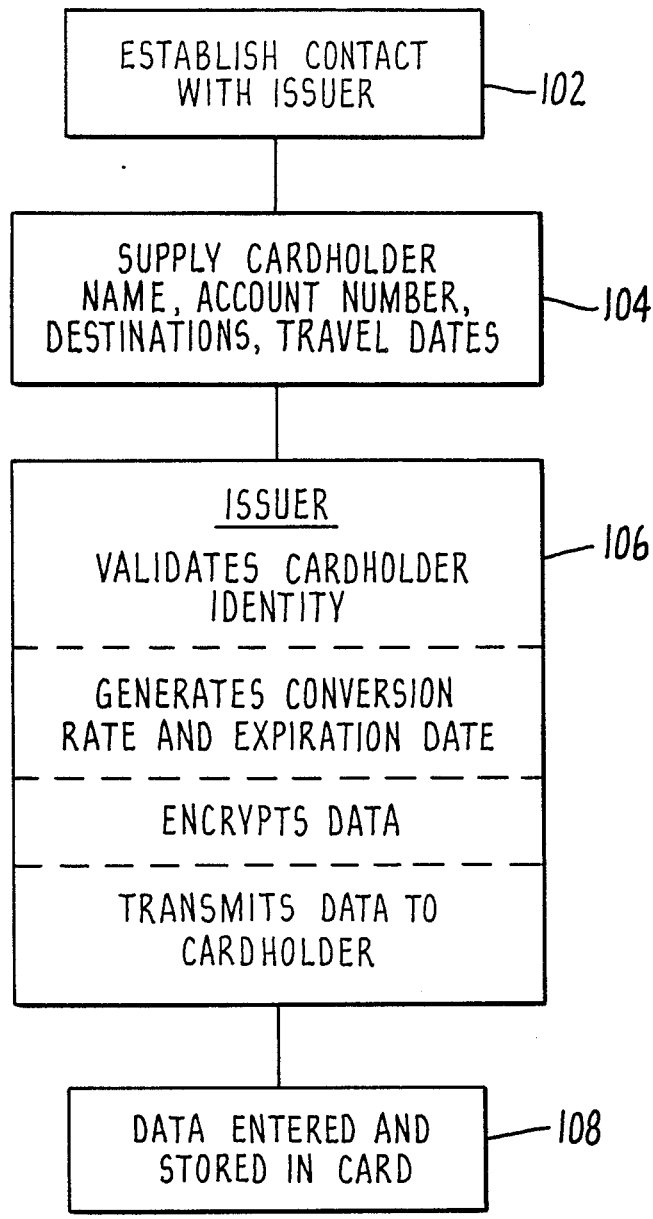
FIG. 3 is a flow chart illustrating the steps taken to enter the currency conversion rates into a transaction card formed in accordance with the subject invention.

FIGS. 3 through 5 illustrate the operation of the device in greater detail. FIG. 3 illustrates the steps carried out to enter the currency conversion rates into the card. As can be appreciated, because of the volatile nature of currency conversion rates, it would not be practical to issue a card with a fixed conversion rate. Therefore, it is envisioned that conversion rates will be entered into the card as needed. The conversion rates will be operable for a fixed period of time.

It should be noted that the currency conversion rate does not have to be exact since it is not being used to reconcile the transaction. Stated differently, the rate is not used as the basis to transfer funds from the cardholder to the merchant. Rather, the rate is merely used to determine whether that particular cardholder should be authorized to complete the transaction. The evaluation of any cardholder is not particularly exact, and is based upon prior performance and statistical analysis. Thus, the transaction limit set by the bank is, to some extent, arbitrary. Thus, there is no need to insure that the conversion to a different currency is exact. Indeed, the card could be loaded with a conversion rate, intentionally weighted in favor of the issuer to reduce potential losses.

The first step in loading a conversion rate into the device requires the establishment of contact with the issuer as shown in block 102 in FIG. 3. Where the card has been placed in a transaction terminal, such as, for example, an automatic teller machine (ATM), this link will be established via communication lines. If the transaction card itself is provided with human operable input and output means as shown in FIGS. 1 and 2, the link with the issuer could be established in person or through a normal telephone. In either case, the issuer must be supplied with the cardholder's name, the account number, the countries to which the cardholder, will be travelling and the travel dates as shown in block 104.

Once supplied with this information, the issuer carries out the steps illustrated in block 106. The first step is to validate the identity of the cardholder based on the transmitted account number. The issuer will then generate a conversion rate and an associated expiration date. As noted above, the conversion rate does not have to be exact. The issuer will typically calculate a favorable rate which is unlikely to be reached in the given time period. If the time period stated by the cardholder is very long, an interim conversion rate can be generated and the cardholder would be requested to recontact the issuer for an update when the conversion rate expires.

The conversion rate and the expiration rate are then transmitted to the cardholder. In the preferred embodiment, some or all of this information is encrypted prior to transmission. The encryption scheme will be based on the account number and is designed to prevent a cardholder from entering a fraudulent rate. Where the card is being operated independently of a transaction terminal, the cardholder will enter the encrypted data corresponding to the conversion rate and the expiration date through the key pad 40. If the card is connected to a transaction terminal for this procedure, the transfer of data will take place automatically through contacts 28. In either case, conversion rates will be generated and supplied for each of the foreign currencies which are expected to be encountered. Once the loading of the conversion rates is complete, no further contact with the issuer is necessary.

Turning to FIG. 4, a flow diagram is provided illustrating the steps the cardholder takes upon entering a country where the currency is different than the base currency of the issuer. As noted above, in existing cards, a transaction limit in the base currency (for example, dollars) will be stored in the memory 30 of the card. This transaction limit may be of the type which will be debited upon each purchase. In any case, in order to successfully use the card in a foreign country, the cardholder must initiate a sequence for converting the stored transaction limit to the foreign currency.

The first step in this procedure requires the cardholder to select the account which he intends to use. It should be noted that the transaction limit will most likely be different for each different account, particularly in a situation where debiting of the transaction limit takes place after each purchase. However, only one conversion rate per currency is necessary for each card. The account is selected by pressing one of keys 40A through 40C.

When an account has been selected in step 202, the microprocessor asks the cardholder provide an unambiguous input of his identity. The most common form for this identification is through the use of a Personal Identification Number (PIN). The PIN is typically a multidigit number known only to the cardholder. The PIN is stored in a read only memory in the card and is compared with a number entered by the cardholder at the time of the transaction. The use of a PIN prevents someone from utilizing a lost or stolen card. Preferably, a different PIN number is used for each account. In the preferred embodiment, the transaction card stores the PIN in encrypted form and the card includes an algorithm to permit the cardholder to change his PIN.

After the PIN has been entered and approved (block 204), the cardholder then selects the desired currency as shown in block 206. In the preferred embodiment, this step is performed in two parts through a scrolling technique. More particulary, after the PIN has been approved, one of a number of possible functions will be shown on the display means. These functions will include "MAKE A PURCHASE", "SEE AMOUNT AVAILABLE", "ADD TO ACCOUNT", "SELECT CURRENCY" etc. The particular prompt on the LCD display can be changed by pressing either the NEXT or BACK keys 40D and E, respectively. When the desired function is displayed, the YES key 40F is pressed. In this case, when the phrase "SELECT CURRENCY" is displayed, the YES key 40F is pressed, causing one of a list of currencies to be displayed.

The currencies which would be displayed could include dollars, yens, francs, pounds, pesos, etc. Once again, the display can be scrolled using the NEXT and BACK keys 40D, E. The desired currency is then selected using the YES button 40F. When this step has been completed, the microprocessor will then convert the transaction limit for the selected account from the base currency to the selected currency using the associated conversion rate. During this process, the microprocessor will check to see that the expiration date associated with the current conversion rate is still in the future. This comparison requires that microprocessor include a calender function. If the expiration date has passed, the conversion will not take place.

The cardholder may verify that the conversion has occurred by selecting from the menu the prompt "SEE AMOUNT AVAILABLE" (block 208). If the conversion has taken place, the transaction limit will be displayed in the selected currency.

The currency can be changed again by the cardholder by the same process. In order to minimize the number of conversion rates stored in the card, the transaction limit should not be converted directly from one foreign currency to another foreign currency. Rather, the microprocessor should first convert the selected foreign currency back to the base currency using the associated conversion rate and thereafter convert the base currency into the newly selected currency using the conversion rate associated with the newly selected currency. The cardholder can select the desired currency just prior to a purchase, however, it may be easier to select the currency at the time when the cardholder enters the foreign country. No further change is necessary until the cardholder leaves the country.

FIG. 5 illustrates the steps carried out when a purchase is to be made in a foreign currency after the transaction limit in the card has been converted to that selected currency. As in the previous flow chart, the customer will first select the account to be used (block 302) by depressing any of the buttons 4A through C. The cardholder is then prompted with the request to enter his PIN (block 304). Assuming the PIN has been entered and approved, the available options can then be observed by scrolling through the list using the NEXT and BACK keys 40D and E. When "MAKE A PURCHASE" is displayed, the user will press the YES button 40F as indicated by block 306. When this option has been selected, the user will be prompted by the display to enter the transaction amount. The cardholder enters the amount of the purchase in the selected currency using the numeric keys of pad 40 as indicated in block 308.

Once the transaction amount has been entered, the microprocessor will compare that amount to the transaction limit expressed in the foreign currency. If the transaction amount exceeds the transaction limit, no authorization will be generated and the transaction will be denied as shown in block 312. If, however, the transaction amount does not exceed the transaction limit, the microprocessor will generate an approval code, as shown in step 314.

In the illustrated embodiment, the approval code will be shown on the display 50, as indicated in block 316. The displayed approval code is then entered into the sales draft by the merchant for future reference. For example, the presence of a proper approval code will generally free the merchant from liability from accepting a lost or stolen card. If the card is connected to a transaction terminal, the approval code might be shown on a display at the terminal or automatically imprinted directly on the sales draft.

Where the particular account accessed is in the nature of a debit account and, if the transaction has been approved, the transaction limit will be debited by the amount of the transaction (block 318). When the funds in the account have been exhausted, the cardholder must request an additional amount from the issuer. This request procedure is performed in a manner analogous to the input of the conversion rates discussed above.

In summary, there has been provided a new and improved transaction card which can be utilized to authorize transactions in a foreign currency. This object is achieved by providing a means for converting a stored transaction limit to a selected currency. When the transaction amount is entered in the selected currency it can then be compared to the converted transaction limit to allow the authorization process to proceed.

While the subject invention has been described with reference to a preferred embodiment, it should be apparent that various changes and modifications could be made therein by one skilled in the art without varying from the scope and spirit of the subject invention as defined by the appended claims.

I claim:

1. A transaction card capable of authorizing a transaction in foreign currencies comprising:
    data entry means;
    storage means for holding a transaction limit represented in a base currency and at least one rate for converting the base currency to a different, foreign currency, said storage means also holding an expiration date associated with each said conversion rate; and
    processor means, which includes a calender function and is connected to the data entry means and the storage means, said processor means functioning such that when a transaction is to be carried out in a foreign currency said processor means will initially determine whether the current date is before the expiration date associated with the conversion rate of said foreign currency, and if so, the processor means will convert the transaction limit initially represented in said base currency into said foreign currency using the associated conversion rate and thereafter compare the transaction amount expressed in the foreign currency supplied through said data entry means to said converted transaction limit to determine if the transaction should be approved.

2. A transaction card as recited in claim 1 wherein said processor means generates an approval code if the transaction amount expressed in a foreign currency does not exceed said converted transaction limit.

3. A transaction card as recited in claim 2 further including a display means.

4. A transaction card as recited in claim 3 wherein after said approval code is generated it is displayed on said display means.

5. A transaction card as recited in claim 3 wherein said transaction amount is shown on said display means after it has been entered.

6. A transaction card as recited in claim 1 wherein if said transaction is approved, said processor means debits the transaction limit by the transaction amount.

7. A transaction card as recited in claim 1 wherein after said transaction limit has been converted into a first foreign currency and said processor means must convert the transaction limit from said first foreign currency to a second foreign currency, said processor means first converts said transaction limit into said base currency from said first foreign currency and thereafter into said second foreign currency using the appropriate currency conversion rate.

8. A transaction card as recited in claim 1 wherein the foreign currency is selected through said data entry means.

9. A transaction card as recited in claim 1 wherein said data entry means is defined by electrical contacts.

10. A transaction card as recited in claim 1 wherein said data entry means is defined by a key pad.

* * * * *